United States Patent
Weatherhead

(10) Patent No.: US 8,626,319 B2
(45) Date of Patent: Jan. 7, 2014

(54) MODULAR ENERGY LOAD MANAGEMENT

(75) Inventor: Norman A. Weatherhead, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 326 days.

(21) Appl. No.: 12/893,715

(22) Filed: Sep. 29, 2010

(65) Prior Publication Data

US 2012/0078431 A1    Mar. 29, 2012

(51) Int. Cl.
*G06F 19/00*        (2011.01)

(52) U.S. Cl.
USPC ............................. 700/22; 700/296; 700/295

(58) Field of Classification Search
USPC ................................................ 700/295, 296
See application file for complete search history.

(56) References Cited

U.S. PATENT DOCUMENTS

| | | | |
|---|---|---|---|
| 4,181,950 A | | 1/1980 | Carter, II |
| 4,310,770 A | * | 1/1982 | Keener et al. ................. 307/35 |
| 7,373,222 B1 | | 5/2008 | Wright et al. |
| 7,580,775 B2 | * | 8/2009 | Kulyk et al. ................. 700/296 |
| 7,873,441 B2 | | 1/2011 | Synesiou et al. |
| 2004/0010324 A1 | | 1/2004 | Bednar et al. |
| 2005/0192713 A1 | * | 9/2005 | Weik et al. ................. 700/295 |
| 2007/0143046 A1 | * | 6/2007 | Budike, Jr. ................. 702/62 |
| 2008/0015742 A1 | * | 1/2008 | Kulyk et al. ................. 700/295 |
| 2008/0272934 A1 | * | 11/2008 | Wang et al. ................. 340/870.11 |
| 2010/0019574 A1 | | 1/2010 | Baldassarre et al. |
| 2010/0070103 A1 | * | 3/2010 | Fleck et al. ................. 700/296 |
| 2010/0106641 A1 | * | 4/2010 | Chassin et al. ................. 705/40 |
| 2011/0119420 A1 | | 5/2011 | Hata |
| 2012/0010758 A1 | | 1/2012 | Francino et al. |
| 2013/0197706 A1 | | 8/2013 | Losee et al. |

OTHER PUBLICATIONS

Office Action mailed Feb. 19, 2013 for U.S. Appl. No. 12/893,722, 15 pages.
Office Action mailed Aug. 22, 2013 for U.S. Appl. No. 12/893,722, 15 pages.

* cited by examiner

*Primary Examiner* — Michael D Masinick
(74) *Attorney, Agent, or Firm* — Turocy & Watson, LLP; William R. Walbrun; John M. Miller

(57) ABSTRACT

Systems and methods are provided that integrate a modular load management solution within a general control architecture. One or more load modules deployed within a controller act as interlocks to energy consuming field devices or machines fed by an energy distribution system within a facility. One or more feeder modules deployed within the controller collect energy supply data from an energy source or feeder on the energy distribution system. The load and feeder modules publish their energy demand and supply data to a virtual energy bus, which facilitates exchange of energy data between the load and feeder modules. The load modules, feeder modules, and virtual energy bus generate multiple views of the facility's overall energy supply and demand status based on the energy data shared between the components, and perform automated load management for the energy distribution system based on the collected data.

24 Claims, 10 Drawing Sheets

MODULAR ENERGY LOAD MANAGEMENT

TECHNICAL FIELD

The claimed subject matter relates generally to energy load management, and more particularly to a modular energy load management architecture integrated within an industrial control scheme.

BACKGROUND

Modern industrial facilities can comprise a large number of machines operating independently or in conjunction to manufacture a product or manage a process. These can include such high-powered machines as welders, multi-ton stamping presses, pumps, machining robots, load bearing conveyors, mixers, and the like. Given the power of their operations, it can require a large amount of energy to drive these machines. Consequently, the cost of energy consumption is one of the largest expenses faced by an industrial enterprise. For this reason, plant engineers strive to efficiently manage their plants' energy loads to ensure that energy is consumed as efficiently as possible without undermining production goals. An important aspect of any load management strategy, particularly when dealing with electrical energy, is minimization of the peak load seen by the energy supply, since the energy cost to the consumer is typically a function of this peak load. However, maintaining a desired peak load while minimizing impact on production is a difficult task, since there is no simple way to coordinate individual machine demand with overall energy usage.

Moreover, given the disparate nature of the machines used in a given facility, different forms of energy may be required to drive the machines, including electrical, steam, gas, water, air, and other types of energy. Supply and consumption of these different forms of energy must typically be measured and managed separately for each form given the different measurement methods and engineering units used for the various forms. It is therefore difficult to aggregate and view overall load data for a facility when different forms of energy are involved without writing complicated custom code.

Given the importance of load management in industrial environments, there is a need for a load management solution that can be easily integrated with a new or existing general control system and tailored to the specifics of a facility's energy distribution system without the need for complicated custom programming. It would also be advantageous to easily aggregate load data relating to different types of energy in order to provide a comprehensive overall view of the facility's energy usage.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to a modular load management architecture that can be integrated within an industrial control system. The architecture can include at least one feeder module and at least one load module deployed within a controller (e.g., a programmable automation controller) that collect, respectively, energy supply data and energy demand data measured from an energy distribution system and provided to the controller. The feeder modules and load modules exchange both the measured data and additional calculated energy data via a virtual energy bus that links the feeder modules with the load modules by virtue of a common bus reference. The modules and the virtual energy bus can comprise configurable attributes that allow the modules and bus to be tailored for a particular energy distribution system without the need for extensive custom programming. The modules and bus can also comprise a number of predefined inputs and outputs that facilitate exchange of the measured and calculated data among the energy management components, and well as interaction with a general control program executing on the controller.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
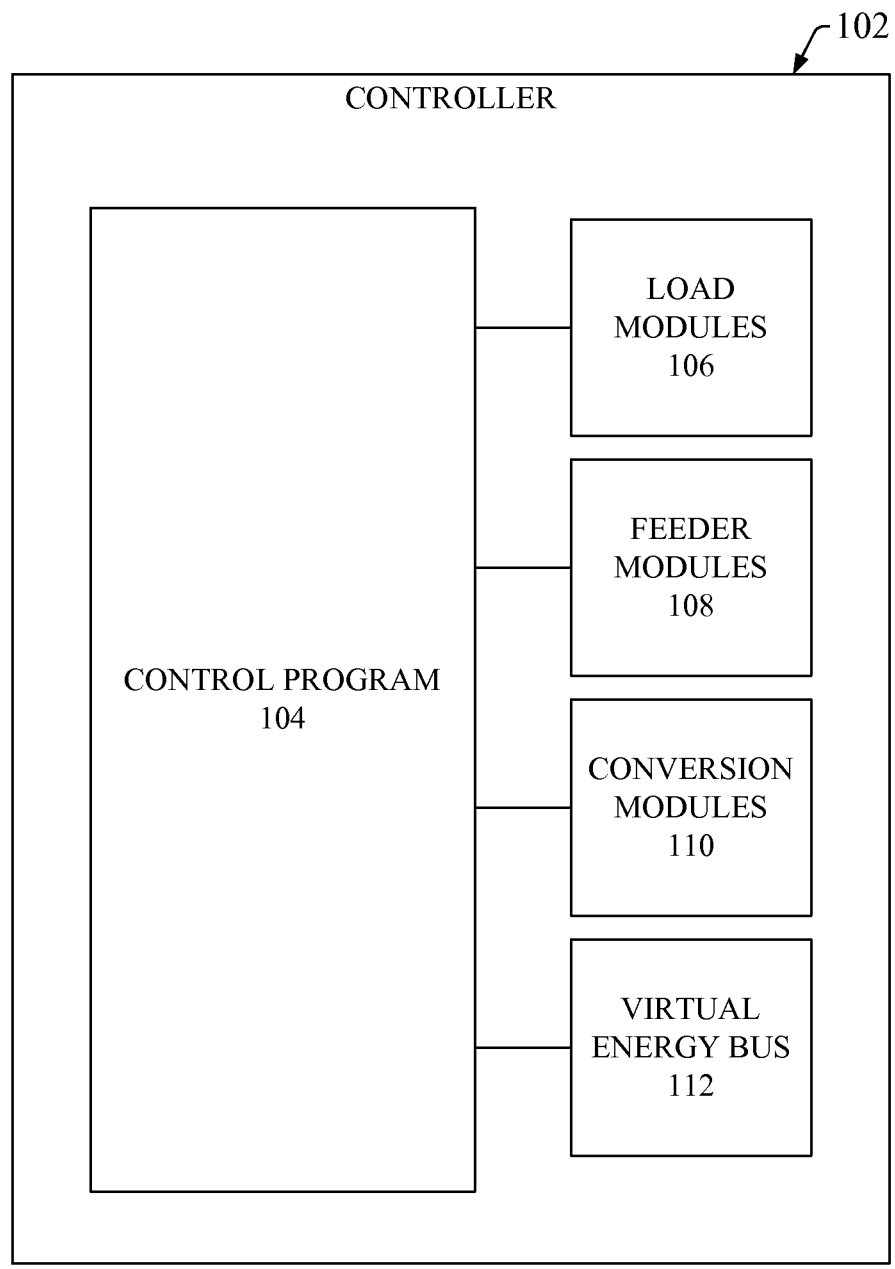
FIG. 1 depicts an exemplary architecture for integrating load management functionality with a control system.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

FIG. 1 depicts an exemplary architecture for integrating load management functionality with a new or existing control system. Controller 102 can comprise an industrial controller, such as a programmable automation controller (PAC), that executes a control program 104 to facilitate automation and control of at least a portion of a process within an industrial facility. Control program 104 can comprise any conceivable type of code used to process input signals read into the controller and to control output signals from the controller, including but not limited to ladder logic, sequential function charts, function block diagrams, or structured text. Data read into or generated by controller 102 can be stored in memory addresses within controller memory, which can comprise native memory or removable storage media. Exemplary controller 102 can be equipped with one or more input and/or output modules that communicate with one or more field devices to effect control of the devices. The input and/or output modules can include digital modules that transmit and receive discrete voltage signals to and from the field devices, or analog modules that transmit and receive analog voltage or current signals to and from the devices. The input and/or output modules can communicate with the controller processor over a backplane such that the digital and analog signals can be read into and controlled by the control program executed by the controller. Controller 102 can also communicate with field devices over a network using, for example, a communication module or an integrated networking port. Exemplary networks over which controller 102 can communicate with field devices can include the Internet, Intranets, Ethernet, DeviceNet, ControlNet, Data Highway and Data Highway Plus (DH/DH+), Remote I/O, Fieldbus, Modbus, Profibus, wireless networks, serial protocols, and the like. It is to be appreciated that controller 102 is not limited to the above specifications, and can include virtually any type of controller used to control an industrial process.

Control program 104 can include and/or interact with the modular load management components of the present invention to facilitate integration of energy management within the general control architecture. These load management components can include load modules 106, feeder modules 108, conversion modules 110, and at least one virtual energy bus 112. These modules can comprise structured software modules deployed within controller 102 that execute autonomously or in conjunction with control program 104 to effect management of energy supply and consumption within the facility. The load management modules can include inputs, outputs, and configurable parameters having predefined functions that, together with analytical functionality built into the modules, allow energy management for one or more energy distribution systems to be easily configured without the need to write complicated custom code. Moreover, by providing an architecture for load management that can be integrated within a general industrial control solution, the load management modules can leverage existing controller I/O to effect management of a facility's energy loads without requiring specialized instrumentation. It is to be appreciated that, although the load management modules are depicted in FIG. 1 as residing on a single exemplary controller 102, the modules can be deployed in multiple controllers to yield a distributed load management system.

Figure 2:
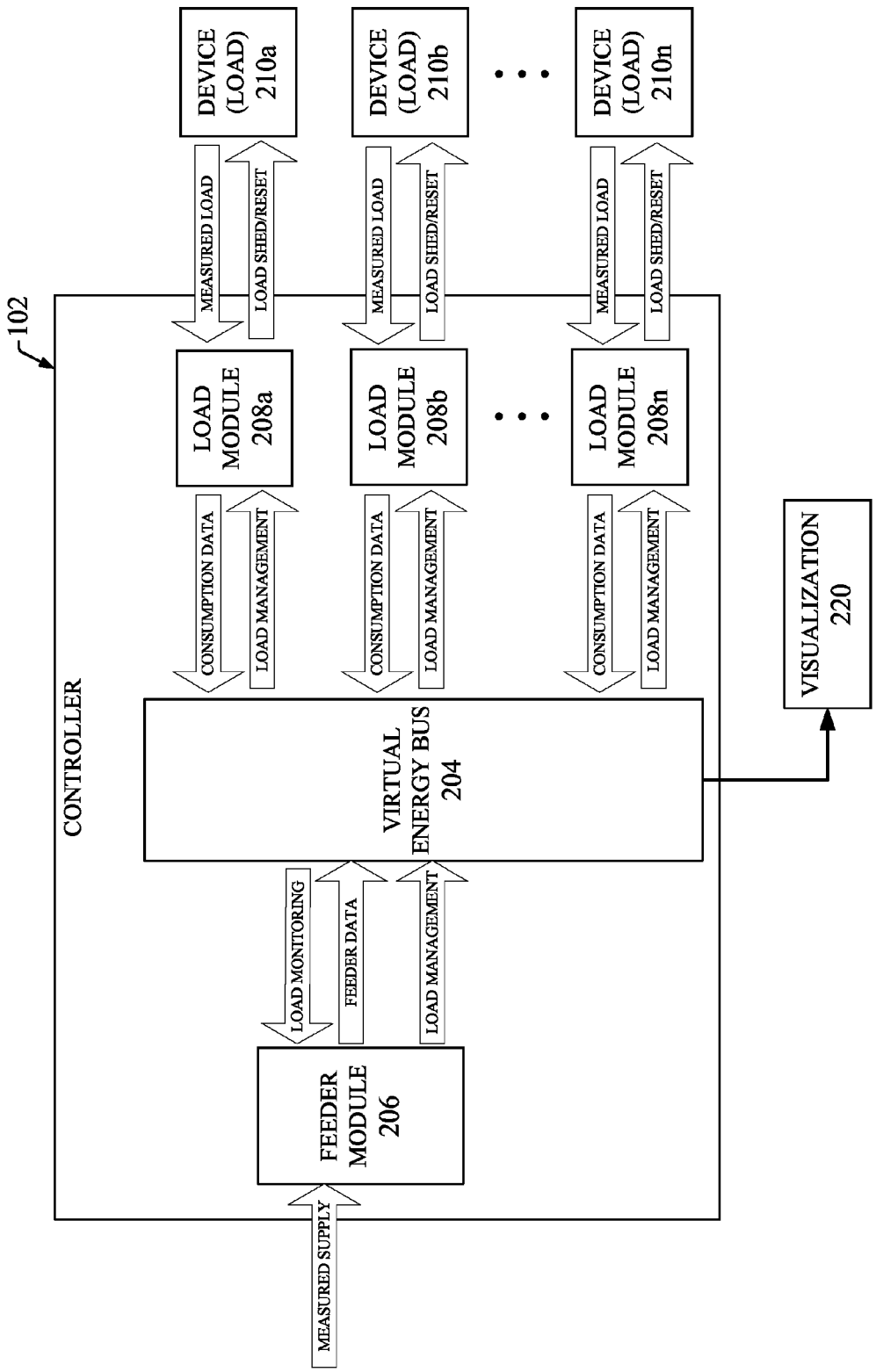
FIG. 2 depicts an exemplary modular load management architecture deployed within industrial controller.

FIG. 2 depicts an exemplary modular load management architecture deployed within industrial controller 102 and comprising the load management modules described above. In this exemplary system, devices 210a-210n represent energy consuming devices or machines operating within an industrial facility. These devices or machines can include, but are not limited to, pumps, motors, welders, presses, conveyors, mixers, casting furnaces, material handling or machining robots, or other such machinery. Each load 210a-210n can comprise a single device or a group of devices having an aggregated energy demand. Devices 210a-210n need not be powered by the same form of energy. That is, loads 210a-210n can represent some heterogeneous combination of electrical loads, hydraulic loads, pneumatic loads, steam powered loads, gas powered loads, or other such load types.

The data collected by the controller for processing by the control program can include energy load data measured for the respective devices or load groups 210a-210n. This can include, for example, measured electrical demand, measured steam power consumption, measured water energy usage, measured gas energy consumption (e.g., propane, natural gas, etc.), or other types of demand data. The measured load data can be provided to the controller using any appropriate means, such as an analog signal from a load meter fed into an analog input module, a parameter read from a smart metering device across a network, or other such techniques. Typically, the data received at the controller will be scaled according to the engineering units (e.g., kW, MW, Btus, Joules, therms, Klbs, etc.) associated with the type of energy being measured.

Load modules 208a-208n can be instantiated in controller 102 and can be integrated with or interact with the control program being executed by the controller. Load modules 208a-208n act as interlocks to loads 210a-210n, and comprise a number of inputs, outputs, and configurable attributes having predefined functionality. These inputs, outputs, and attributes can be used to share data generated by the load modules with other load management components, as well provide access to module data by control program 104 executing in controller 102. For example, each load module 208a-208n can receive its measured load data in a floating point Inp_LoadPV input register associated with the module, and publish this measured load data, together with other values calculated by the load module, to other components of the load management architecture. Load modules 208a-208n can also include Boolean outputs that initiate shedding or resetting of corresponding loads in a coordinated fashion in order to keep peak demand below a maximum value, as explained in more detail below. Using data provided by other components within the load management architecture, load modules 208a-208n can also calculate and publish instantaneous load statistics for use by the control program or for visualization on a display. Moreover, to ensure that the architecture accurately represents the total system load even if metering is not available for some loads, load modules 208a-208n can be provided with a configurable load register that can receive a manually entered estimated value of a missing load, thereby allowing the architecture to factor unmetered loads. Thus, load modules can represent both metered and unmetered loads so that the architecture has an accurate accounting of the overall load comprising an industrial system.

An exemplary set of input, outputs, and configuration parameters for the load module is listed in Table 1 below. This list is only intended to be illustrative, and the load modules contemplated herein are not limited to the example I/O listed here.

TABLE 1

Load Module I/O

| Name | Data Type | Usage | Description |
|---|---|---|---|
| REF_eBus | eBus | In/Out | Reference to Virtual Energy Bus (eBus) |
| Inf_DvcDscrpt | String | Local | Device description (e.g. for HMI display) |
| Inf_DvcID | String | Local | Device ID (Tag ID) |
| Cfg_EULoad | String | Local | Load engineering units |
| Inp_LoadPV | Real | Input | Input load when monitored (in engineering units) |
| Has_PVConv | Boolean | Input | Has conversion object |
| Cfg_Load | Real | Output | Configure load used when load is not monitored, or when in simulation (in engineering units) |
| Val_Load | Real | Output | Load (published to eBus) (in engineering units) |
| Cfg_EUSupply | String | Local | Supply engineering units |
| Cfg_Supply | Real | Input | Configured supply used when not provided by eBus (in engineering units) |
| Val_Supply | Real | Input | Supply available |
| Val_PctOfSupply | Real | Output | Load as a percentage of supply ((Load/Supply) * 100) |
| Inp_LoadApl | Real | Input | Load applied |
| Cfg_ShedEnbl | Boolean | Input | Enable load shedding |
| Cfg_EShedEnbl | Boolean | Input | Enable emergency load shedding |
| Cfg_ShedPriority | Integer | Input | Configure load shed priority |
| Val_ShedPriority | Integer | Output | Shed priority for load |
| Inp_Shed | Boolean | Input | Input to force load shed |
| Out_Shed | Boolean | Output | Shed Load |
| Sts_Shed | Boolean | Output | Load was shed |
| Sts_EShed | Boolean | Output | Load was emergency shed |
| Sts_LoadNotShed | Boolean | Output | Load that was supposed to be shed did not shed |
| MCmd_Shed | Boolean | Local | Maintenance command to shed load |
| Rdy_Shed | Boolean | Local | Ready to accept maintenance command to shed load |
| Val_PriorityThreshold | Integer | Output | When shedding loads - Shed all loads with a configured Shed Priority less than or equal to the Priority Threshold. When resetting loads - Reset all loads with a configured Reset Priority greater than or equal to the Priority Threshold |
| Inp_Reset | Boolean | Input | Input to force load shed reset |
| Cfg_ShedResetEnbl | Boolean | Input | 1 = Enable automatic reset after load is shed; 0 = Reset must be performed by logic or via HMI |
| Cfg_ResetPriority | Integer | Output | Reset priority for shed load |
| Cfg_MinResetTime | Real | Input | Minimum reset time (seconds); minimum period of time to wait prior to reset after load is shed |
| Sts_ResetRdy | Boolean | Output | Ready to reset shed load |
| Sts_LoadNotReset | Boolean | Output | Load that was supposed to be reset has not reset |
| MCmd_Reset | Boolean | Local | Maintenance command to reset shed load |
| Rdy_Reset | Boolean | Local | Ready to accept maintenance command to reset shed load |
| MCmd_Sim | Boolean | Input | Maintenance command to place load into simulation |
| Rdy_Sim | Boolean | Output | Ready to receive MCmd_Sim |
| Inp_Sim | Boolean | Input | Place load into simulation |
| Sts_Sim | Boolean | Output | Load in simulation |

The load management architecture can also include at least one feeder module 206 deployed in the controller. Like load modules 208a-208n, feeder module 106 can comprise a number of predefined inputs, outputs, and configurable parameters that facilitate exchange of data with other components and with control program 104. Among other inputs, feeder module 206 can receive an energy supply value measured from a feeder that provides power to at least one of the loads 210a-210n. This measured supply value can be published by the feeder module 206 to the virtual energy bus 204 and shared with load modules 208a-208n, thereby providing the load modules with knowledge of the available supply at the feeder. Feeder module 206 also monitors all loads published to virtual energy bus 204 by load modules 208a-208n and makes load management decisions based on the monitored load data. This can include deciding when to initiate load shedding based on the total monitored load or based on a ratio of the total load to the total measured supply. Thus, the architecture allows energy supply and demand data to be exchanged via virtual energy bus 204, thereby providing a means to intelligently and autonomously manage energy usage using integrated load management functionality.

An exemplary set of input, outputs, and configuration parameters for the feeder module is listed in Table 2 below. This list is only intended to be illustrative, and the feeder module contemplated herein is not necessarily limited to the example I/O listed here.

TABLE 2

Feeder Module Attributes

| Name | Data Type | Usage | Description |
| --- | --- | --- | --- |
| REF_eBus | eBus | In/Out | Reference to Virtual Energy Bus (eBus) |
| inf_DvcDscrpt | String | Local | Device description (e.g. for HMI display) |
| Inf_DvcID | String | Local | Device ID (Tag ID) |
| Cfg_EUSupply | String | Local | Supply engineering units |
| Cfg_Supply | Real | Input | Configure supply to feeder when feeder is not monitored (in supply engineering units) |
| Cfg_HasSupplyPV | Boolean | Input | Has measured supply |
| Inp_SupplyPV | Real | Input | Input supply to feeder when measured (in supply engineering units) |
| Val_Supply | Real | Output | Supply present at feeder |
| Cfg_EULoad | String | Local | Load engineering units |
| Cfg_Load | Real | Input | Configured load used when load is not monitored or when module is in simulation (in load engineering units) |
| Cfg_HasLoadPV | Boolean | Input | Has measured load |
| Inp_LoadPV | Real | Input | Load Input (in load engineering units) |
| Val_Load | Real | Output | Load present at feeder (Inp_LoadPV + eBus.Val_Load) |
| Sts_LoadExceedsSupply | Boolean | Input | Load on feeder exceeds available supply |
| Inp_SupplyEnbl | Boolean | Input | Supply enabled (applied) |
| Sts_SupplyEnbl | Boolean | Output | Supply enabled (applied) |
| Sts_SupplyNotEnbl | Boolean | Output | Supply not enabled (not applied) |
| Cfg_ShedEnbl | Boolean | Input | Enable load shedding |
| Cfg_EShedEnbl | Boolean | Input | Enable emergency load shedding |
| Inp_Shed | Boolean | Input | Activate load shed |
| Inp_EShed | Boolean | Input | Activate emergency load shed |
| Sts_Shed | Boolean | Output | Load shed active |
| Sts_EShed | Boolean | Output | Emergency Load Shed Active |
| Sts_LoadNotShed | Boolean | Output | One or more loads that have been instructed to shed have not shed |
| MCmd_Shed | Boolean | Local | Maintenance command to shed load |
| Rdy_Shed | Boolean | Local | Ready to accept maintenance command to shed load |
| Cfg_ShedResetEnbl | Boolean | Input | 1 = Enable automatic reset after load is shed<br>0 = Reset must be performed by logic or via the HMI |
| Inp_Reset | Boolean | Input | Reset shed load |
| Sts_ResetRdy | Boolean | Output | Ready to reset shed load(s) |
| Sts_LoadNotReset | Boolean | Output | One or more loads instructed to reset have not reset |
| MCmd_Reset | Boolean | Local | Maintenance command to reset shed load |
| Rdy_Reset | Boolean | Local | Ready to accept maintenance command to reset shed load |
| MCmd_Sim | Boolean | Input | Maintenance command to place Feeder module and all associated loads into simulation |
| Rdy_Sim | Boolean | Output | Ready to receive MCmd_Sim |
| Inp_Sim | Boolean | Input | Place Feeder module and all associated loads into simulation |
| Sts_Sim | Boolean | Output | Feeder module and all associated loads are in simulation |
| Val_LstGdLoad | Real | Output | Last good load (with circuit breaker closed) (in engineering units) |
| Val_PctOfSupply | Real | Output | Load as a percentage of supply (Load/Supply * 100) |

TABLE 2-continued

Feeder Module Attributes

| Name | Data Type | Usage | Description |
|---|---|---|---|
| Val_PriorityThreshold | Int | Output | When shedding loads - Shed all loads with a configured Shed Priority less than or equal to the Priority Threshold When resetting loads - Reset all loads with a configured Reset Priority greater than or equal to the Priority Threshold |
| Val_LoadNextResetPriority | Real | Output | Total load which will be applied by decrementing to next Priority Threshold |
| Val_LoadNextShedPriority | Real | Output | Total load which may be shed by incrementing to next Priority Threshold |
| Sts_Reset CapacityOK | Boolean | Input | Supply capacity exists to reset shed loads assigned to the next Reset priority |
| Val_TotalNumberOfLoads | Integer | Outpupt | Total number of loads which belong to the feeder module |
| Val_NumberOfLoads | Integer | Output | Number of loads currently fed by the feeder |

As discussed above, virtual energy bus 204 (also known as the eBus) enables load modules 208a-208n and feeder module 206 to dynamically exchange energy supply (feeder) and demand (consumption) data. Virtual energy bus 204 can also employ the data published by the feeder and load modules to perform aggregated energy calculations that provide a highly granular picture of the facility's overall instantaneous energy utilization. For example, virtual energy bus can compute a total load seen by all load modules 208a-208n as a percentage of the available supply reported by the feeder module(s), a total energy load seen by each energy source associated with the bus, and other such calculations. In this way, virtual energy bus 204 can provide multiple orthogonal views of a facility's energy usage. Multiple energy busses can be instantiated and associated with selected subsets of load modules and feeder modules if segregated management of separate load systems is desired.

An exemplary set of input, outputs, and configuration parameters available for the virtual energy bus is listed in Table 3 below. This list is only intended to be illustrative, and the virtual energy bus contemplated herein is not necessarily limited to the I/O listed here.

TABLE 3

Virtual Energy Bus I/O

| Name | Data Type | Description |
|---|---|---|
| Cfg_EUSupply | String | Supply engineering units |
| PSet_Supply | Real | Add supply to eBus (in engineering units) |
| Val_Supply | Real | Supply available on eBus (from feeder module) (in engineering units) |
| Cfg_EULoad | Sting | Load engineering units |
| PSet_Load | Real | Add load to eBus (in engineering units) |
| PSet_LoadNextShedPriority | Real | Add load to next shed priority |
| PSet_LoadNextResetPriority | Real | Add load to next reset priority |
| Val_Load | Real | Load on eBus (in engineering units) |
| Val_PctOfSupply | Real | eBus load as a percentage of supply ((Load/Supply) * 100) |

TABLE 3-continued

Virtual Energy Bus I/O

| Name | Data Type | Description |
|---|---|---|
| Set_TotalNumberOfLoads | Integer | Increment total number of loads on eBus |
| Val_TotalNumberOfLoads | Integer | Total number of loads that belong to the eBus |
| Set_NumberOfLoads | Integer | Increment number of loads being fed by eBus |
| Val_NumberofLoads | Integer | Number of loads being fed by eBus |
| Val_PriorityThreshold | Integer | When shedding loads - shed all loads with a configured Shed Priority less than or equal to the Priority Threshold. When resetting loads - Reset all loads with a configured Reset Priority greater than or equal to the Priority Threshold |
| Sts_Shed | Boolean | Load shedding active |
| Sts_EShed | Boolean | Emergency Load shedding active |
| Sts_LoadNotShed | Boolean | One or more loads that were instructed to shed have not shed |
| Sts_Reset | Boolean | Load shed reset active |
| Sts_LoadNotReset | Boolean | One or more loads that were instructed to reset have not reset |
| Cfg_CalcLoad | Boolean | Calculate load |
| Cfg_CalcSupply | Boolean | Calculate supply |
| Sts_ShedResetRdy | Boolean | Ready to reapply load |
| MCmd_Sim | Boolean | Maintenance command to place load in simulation |
| Sts_Sim | Boolean | Load in simulation |

In addition to being used by the controller to monitor and manage energy distribution, the data generated by the feeder module 206, load modules 208a-208n, and virtual energy bus 204 can also be rendered on a visualization component 220 for presentation to a user. Visualization component 220 can comprise any suitable user interface, such as a human-machine interface (HMI) that can read from and write to data registers within controller 102. Visualization component 220 can display the value of any input, output, or attribute associated with the load management components in order to present a highly granular view of a facility's current energy supply and usage status.

While the load management modules described above are illustrated in FIG. 2 as residing on a single controller, remote connectivity features inherent in the modules can allow for a distributed load management system deployed across multiple controllers. For example, load modules residing on a first controller can reference and exchange data with a virtual energy bus residing on a second controller, such that the load modules' data resident on the first controller is made available to the second controller, and thereby to a feeder module residing on the second controller. Load management decisions can then made by the feeder module or the virtual energy bus on the second controller taking into account the load module data received from the first module, and load management commands (e.g. load shed commands) generated by the modules on the second controller can be delivered to the load modules on the first controller. By deploying load management modules across multiple controllers and providing remote connectivity between the modules, a distributed load management system can be implemented. These aspects can allow modular load management to be implemented in an existing system wherein the various sets of energy sources and loads comprising the system are monitored by different controllers.

Figure 3:
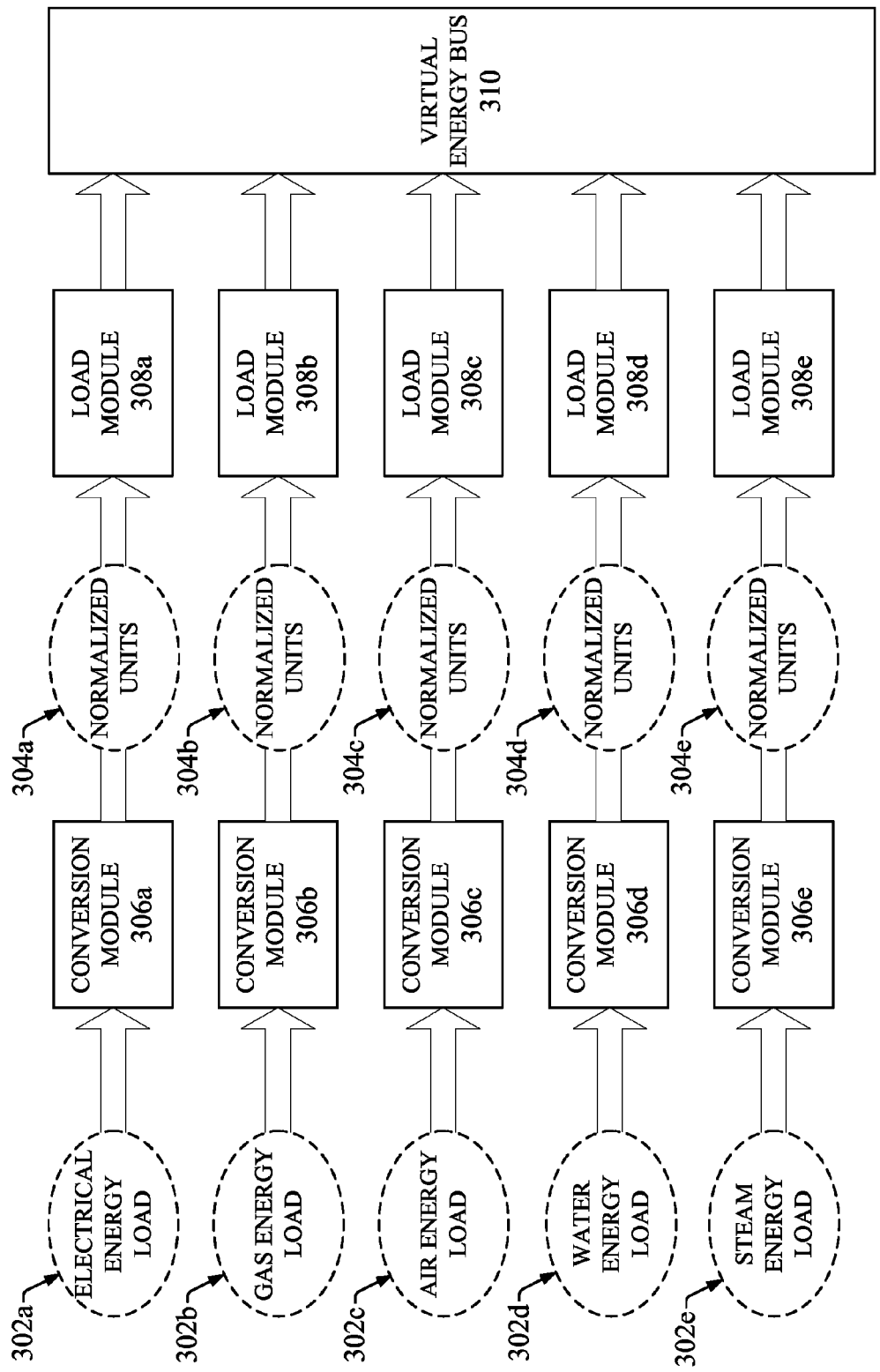
FIG. 3 depicts an exemplary data flow illustrating a load data conversion.

Since loads 210a-210n can comprise loads of different energy types (e.g., electrical, steam, gas, etc.), at least a portion of the measured load data fed to load modules 208a-208n may need to be converted in order to normalize the load data to a common set of engineering units. In this way, energy data of different types can be aggregated to generate an overall view of a facility's total energy usage. To achieve this conversion, one or more conversion modules can be deployed in controller 102 as part of the load management architecture. An exemplary data flow illustrating a load data conversion is depicted in FIG. 3. Energy load data 302a-302e can represent measured load data that has been provided to controller 102 using any suitable signaling means. Data 302a-302e can represent data from a heterogeneous set of devices powered by different types of energy, including electrical load data 302a, gas energy load data 302b, air energy load data 302c, water energy load data 302d, and steam energy load data 302e. Load data 302a-302e can be provided to conversion modules 306a-306e, wherein the conversion modules 306a-306e can be individually configured to convert their respective load data from their original engineering units to a selected normalized engineering unit to yield normalized data 304a-304e. By converting the load data sets 302a-302e to a common engineering unit, the disparate load types can be standardized to facilitate aggregated analysis of the data by the virtual energy bus 310. The normalized data 304a-304e can be provided to load modules 308a-308e, which respectively correspond with load data 302a-302e. Load modules 308a-308e can then publish the normalized load data to virtual energy bus 310 for aggregated analysis, as described above. Using this normalized load data, virtual energy bus 310 render one or more aggregated views of a facility's total energy usage that includes all types of energy being used. Moreover, since conversion modules 306a-306e can easily be configured by selecting appropriate parameter values to effect a desired unit conversion, no custom programming is needed to generate normalized load data in a heterogeneous energy environment.

An exemplary set of input, outputs, and configuration parameters available for the virtual energy bus is listed in Table 4 below. This list is only intended to be illustrative, and the virtual energy bus contemplated herein is not necessarily limited to the I/O listed here.

TABLE 4

Conversion Module I/O

| Name | Data Type | Usage | Description |
| --- | --- | --- | --- |
| Inp_PV | Real | Input | Raw process variable for conversion |
| Val | Real | Output | Converted process variable |
| Cfg_InConversionSlct | Integer | Input | Selected input conversion factor |
| Cfg_InMultiplierSlct | Integer | Input | Selected input multiplier |
| Cfg_inRateTimeSlct | Integer | Input | Selected input rate time |
| Cfg_OutConversionSlct | Integer | Input | Selected output conversion factor |
| Cfg_OutMultiplierSlct | Integer | Input | Selected output multiplier |
| Cfg_OutRateTimeSlct | Integer | Input | Selected output rate time |
| Cfg_InEU | String | Local | Engineering units - raw PV |
| Cfg_OutEU | String | Local | Engineering units - converted PV |
| Cfg_Conversion | Convert | Local | Data structure containing raw to unity conversion factor |
| Cfg_Multiplier | Factor | Local | Data structure containing multipliers |
| Cfg_RateTime | Factor | Local | Data structure containing rate multipliers |
| Val_InConversionFactor | Real | Output | Input conversion factor |
| Val_InRateTime | Real | Output | Input rate time |
| Val_OutConversionFactor | Real | Output | Output conversion factor |
| Val_OutMultiplier | Real | Output | Output multiplier |
| Val_OutRateTime | Real | Output | Output rate time |

The modular load management architecture described herein can be integrated as part of a general controls architecture by deploying the load management modules within a programmable automation controller (PAC), thereby allowing energy load management functionality to be added to an existing control solution and facilitating coordination between load management considerations and control of plant operations in general. In addition, by deploying the modular load management architecture in a controller executing a control program, the architecture can leverage the controller's hardwired and networked I/O to manage energy usage in an integrated and coordinated fashion without specialized instrumentation. This can include, for example, automatic shedding of loads when the feeder module determines that demand is at risk of exceeding available supply (as described in more detail below). Moreover, the inputs, outputs, and configuration parameters associated with the modules and virtual energy bus of the present architecture (e.g., the exemplary I/O of Tables 1-4) can be rendered on any suitable human-machine interface (HMI) communicating with controller 102 for reporting purposes.

Figure 4:
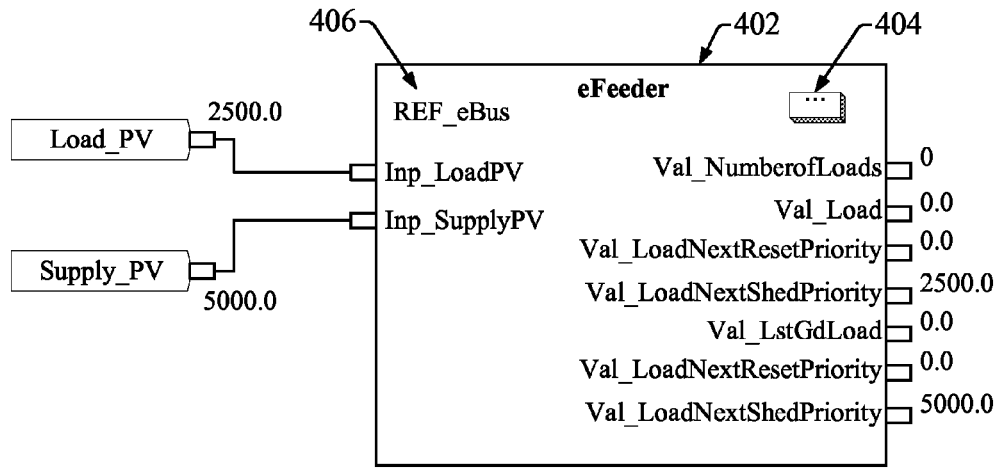
FIG. 4 depicts an exemplary feeder module as rendered on a control programming interface.
Figure 5:
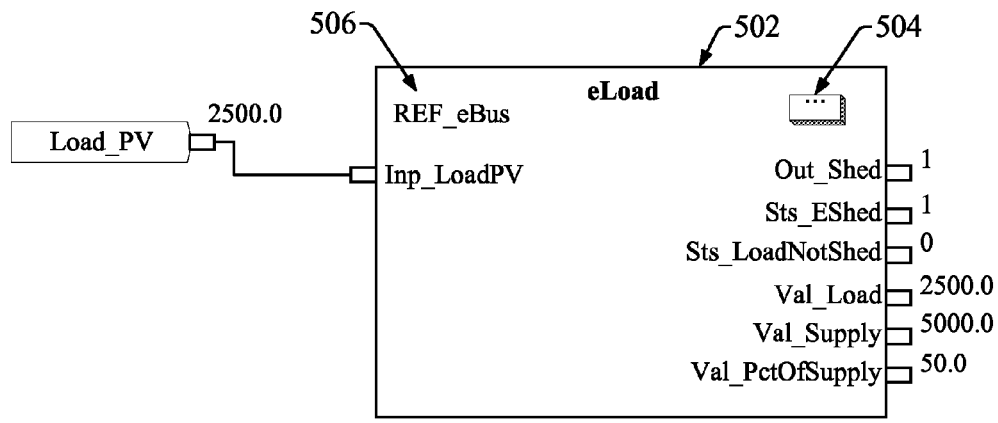
FIG. 5 depicts an exemplary load module as rendered on a control programming interface.
Figure 6:
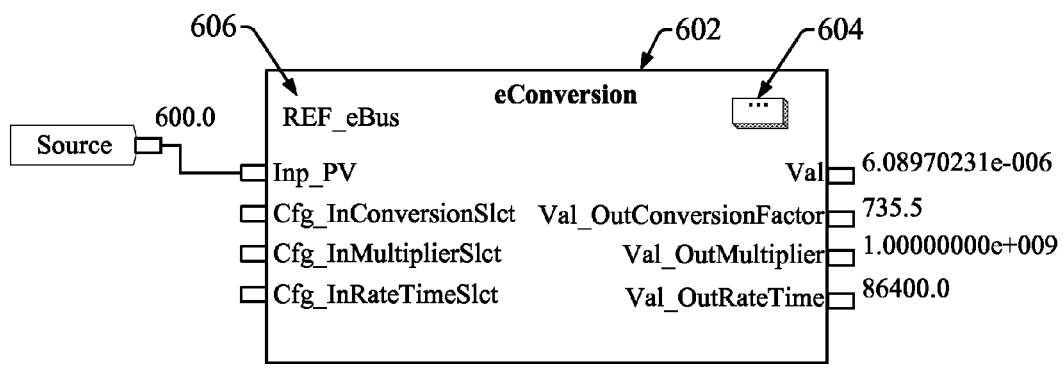
FIG. 6 depicts an exemplary conversion module as rendered on a control programming interface.

FIGS. 4-6 depict exemplary feeder, load, and conversion modules, respectively, as they might be rendered on a control programming interface used to configure a control program executing on controller 102. Each module 402, 502, and 602 displays one or more of its inputs on the left side of the module, and one or more outputs on the right side. These inputs and outputs can be accessed by the control program either by reference to the names for the respective I/O or by graphically linking the inputs and outputs to other program elements (e.g. in a sequential function chart programming environment). Modules 402, 502, and 602 each include a configurable reference 406, 506, or 605 identifying the virtual energy bus (eBus) to be associated with the module. That is, modules 402, 502, and 602 publish data to and receive data from the particular virtual energy bus identified by references 406, 506, and 606, respectively. Configuration buttons 404, 504, and 605 allow a user to access configurable parameters associated with the respective modules to facilitate customization of the modules, such as by setting values for the configurable parameters listed in Tables 1, 2, and 4. For example, configuration buttons 404, 504, and 604 can invoke a list of the configuration parameters listed in Tables 1, 2, and 4, and the user can set values for these parameters to configure the module.

Figure 7:
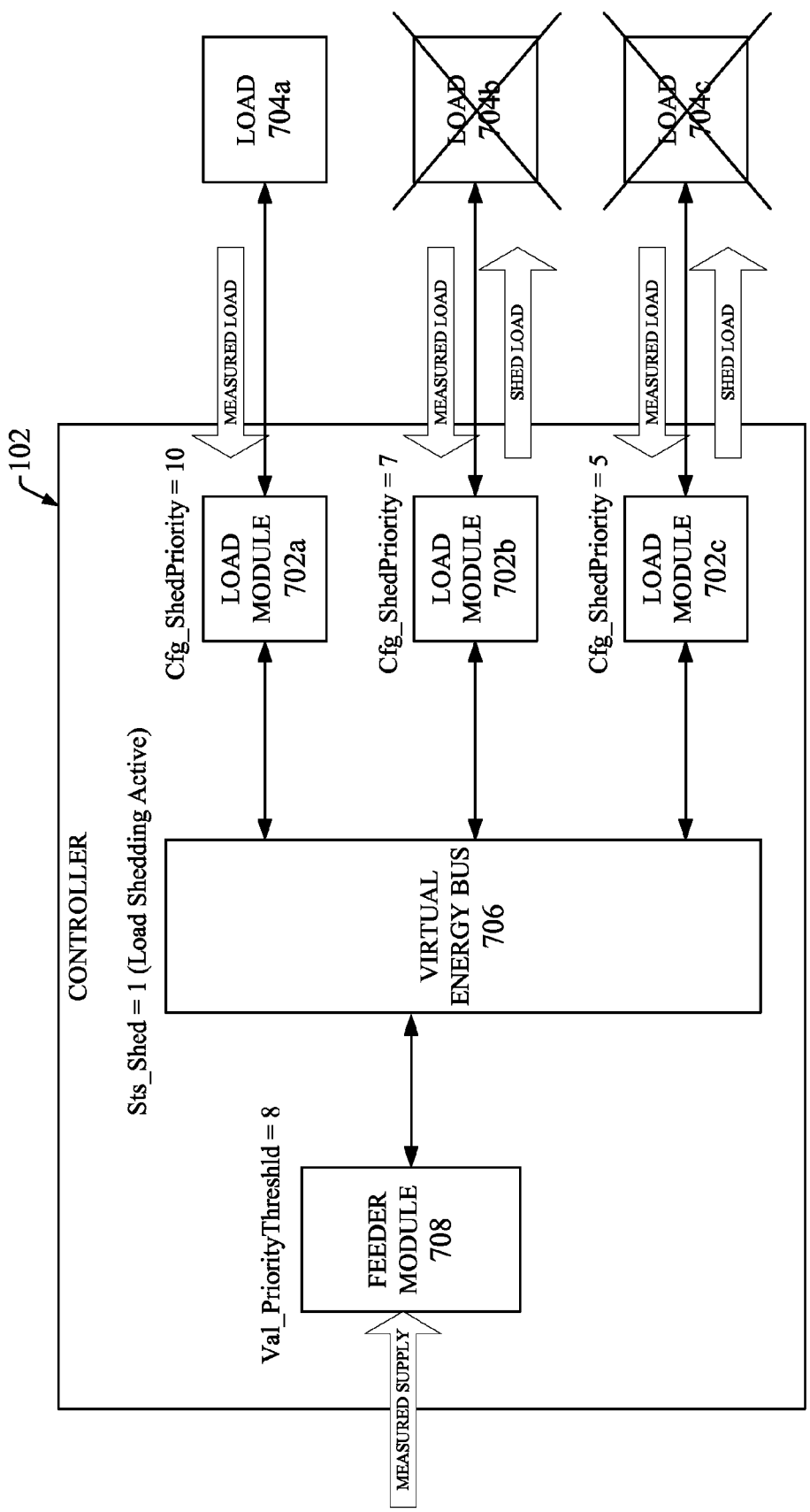
FIG. 7 illustrates a load shedding scenario in accordance with an exemplary configuration of the subject load management architecture.

The load management architecture described herein can allow coordinated load management functions to be achieved easily using the highly configurable programming modules described above. This can include priority-based shedding of loads to ensure that a desired maximum peak load is not exceeded. FIG. 7 illustrates a load shedding scenario in accordance with an exemplary configuration of the subject load management architecture. Loads 704a-704c are fed by a supply feeder (not shown). Each load 704a-704c can represent a single energy consuming device, such as a motor, or a group of devices monitored as a single collective load. Load modules 702a-702c are deployed in controller 102 (or across multiple controllers) and receive measured load data read by the controller I/O from loads 704a-704c. Load modules 702a-702c publish this load data to virtual energy bus 706 as described above. Feeder module 708, also deployed within controller 102, receives measured supply data from the supply feeder providing power to loads 704a-704c, and publishes this data to virtual energy bus 706. Feeder module 708 also monitors the load data published to virtual energy bus 706 and calculates a total energy consumption.

Feeder module 708 can monitor the total load on virtual energy bus 706 and make a decision regarding whether to initiate load shedding. This decision can be based on a comparison between the total load on the virtual energy bus and a configured threshold value. If feeder module 708 determines that the total load on virtual energy bus 706 exceeds the threshold value (that is, too much energy is being collectively drawn by loads 704a-704c), the feeder module can initiate load shedding for the loads associated with virtual energy bus 706. Alternatively, feeder module 708 can compute the total load seen on virtual energy bus 706 as a percentage of the measured supply (e.g., Val_PctOfSupply of Table 2) and initiate load shedding when the percentage reaches a configured threshold. Feeder module 708 an also include a Boolean input (e.g., Inp_Shed of Table 2) that allows load shedding to be initiated from an external source, such as a separate portion of code or a manual input.

When load shedding is active, selected load devices are instructed by their respective load modules to enter a no-load or low-load state. This can comprise issuing a command to turn off the selected devices, to switch the selected devices to a low-energy operating mode, to disconnect a breaker feeding the selected devices, or other appropriate action. The load shed command issued to a device can be initiated by the device's load module (e.g., by setting a Boolean output associated with the load module, such as the Sts_Shed ouput of Table 1) when the load module receives an indication from the virtual energy bus that load shedding is active, and translated to an appropriate output signal from the controller to change the state of the device or a breaker associated therewith. The load shed output of the load module can also be incorporated into existing programming in the controller if additional conditions for switching the device to low-load state are desired.

In order to prioritize shedding of loads such that the least critical loads are shed first, a shed priority value can be configured for each load module 702a-702c (e.g., by setting a value for the Cfg_ShedPriority input of Table 1). These shed priority values can be configured on the load modules by the user according to a perceived criticality of the loads associated with the respective load modules, such that load modules associated with less critical load devices are assigned lower shed priority values, while higher shed priority values are assigned to loads modules whose associated loads are deemed more critical to operations and which should only be shed in extreme load conditions.

To coordinate prioritized load shedding, feeder module 708 can include an integer priority threshold value (e.g., Val_PriorityThreshold of Table 2). The value of the feeder module's priority threshold during load shedding determines which loads will be shed at a given time. When load shedding is active, only those loads whose configured shed priority value is less than or equal to the priority threshold value will be shed. In the example of FIG. 7, load modules 702b and 702c have shed priorities less than the priority threshold set for feeder module 708. Therefore, when load shedding is active, load modules 702b and 702c instruct their corresponding loads 704b and 704c to enter a low-load or no-load state. Since the shed priority value set for load module 702a is higher than the priority threshold, corresponding load 704a is permitted to continue normal operation.

Load modules 702a-702c can monitor their respective loads during load shedding and generate relevant feedback information, which can include setting a status bit indicating that the corresponding load was shed successfully (e.g., by setting the Sts_Shed output of Table 1). If a load module issues an instruction for its associated load to be shed and subsequently determines that the load has not fallen within an expected range after a preset amount of time has elapsed since issuing the instruction, the load module can set a status output indicating that the load has not shed (e.g., the Sts_LoadNotShed output of Table 1). These outputs, as well as any other relevant feedback and diagnostic information generated by load modules 702a-702c, can be published to virtual energy bus 706 and shared with feeder module 708. Likewise, feeder module 708 can monitor the total load published to virtual energy bus 706 during load shedding and generate report or diagnostic information relevant to the overall load shedding operation.

During load shedding, the priority threshold value of feeder module 708 can be increased incrementally as needed to ensure that a sufficient number of loads have been shed to maintain a desired peak demand without disabling an excessive number of loads. For example, if feeder module 708 determines that load shedding is necessary because of excessive load-to-supply ratio, the shed priority can be set to a low value prior to initiating load shedding. This ensures that only relatively low priority devices are disabled in order to shave sufficient demand. The initial priority threshold value can be set as a default for feeder module 708, or alternatively can be set by the control program executing in controller 706. Feeder module 708 can monitor the loads on virtual energy bus 706 as well as the measured supply during the load shedding operation to ensure that the demand is maintained below an acceptable level. If feeder module 708 determines that additional loads must be shed to maintain an acceptable demand (e.g. if the percentage of the supply being drawn by the remaining loads continues to exceed an acceptable threshold), the priority threshold can be incremented, thereby causing additional load modules having higher load priorities to disable their respective loads. This adjustment of the priority threshold can be performed by feeder module 708 itself if the feeder module determines that the energy draw reported by virtual energy bus 706 remains above an acceptable threshold for a predetermined amount of time after load shedding was initiated or since the previous priority threshold adjustment. Alternatively, the priority threshold can be adjusted by the control program executing in controller 102 by writing an appropriate value to the feeder module 708. Feeder module 708 can also calculate and report an estimate of how much additional load will be shed from the current total load if the priority threshold is incremented to the next higher integer value. This value can be reported in one of the feeder module's integer output (e.g., the Val_LoadNextShedPriority output of Table 2). This value can be based in part on the number and identity of additional load devices that will be shed as a result of incrementing the priority threshold, since this information is made available to the Feeder module from load modules 702a-702c and virtual energy bus 706.

After sufficient loads have been shed, the shed loads can be reset in accordance with preference settings configured for the modules. For example, feeder module 708 can include a Boolean input (e.g., the Cfg_ShedResetEnbl input of Table 2) that can be configured to select whether the feeder module is to reset loads automatically after shedding, or alternatively if resetting of loads is to be performed by the control program or via a manual reset, such as a manual input from an HMI. If automatic resetting is selected, feeder module 708 can reference a configured minimum reset time value (e.g., Cfg_MinResetTime of Table 2) to determine when to initiate load resetting. The minimum reset time value represents a minimum period of time after confirmation that the necessary loads were shed. After this time has elapsed, and if load shedding is no longer necessary, feeder module 708 can initiate load resetting, whereby the feeder module issues commands to load modules 702a-702c (via virtual energy bus 706) to reset their respective loads.

When load resetting is in progress, the previously shed loads can be reset according to reset priority values configured for the associated load modules (e.g., Cfg_ResetPriority of Table 1). As with load shedding, the resetting of loads can be prioritized based on a comparison of the respective reset priority values for the load modules with the priority threshold value of feeder module 708. When load resetting is initiated by feeder module 708, loads whose corresponding load modules have reset priority values greater than or equal to the priority threshold will be reset. Priority threshold can then be decreased in increments according to a preconfigured routine in order to reset the loads having lower Reset Priorities. The decision to decrease the priority threshold can be based in part on the current load or load-to-supply ratio, together with an estimated value of the total load expected to be applied when the priority threshold is decremented to the next value (as calculated by the feeder module and reported as an output, e.g. Val_LoadNextResetPriority of Table 2). Feeder module 708 can estimate this expected additional load based on knowledge of which load modules will be reset when the priority threshold is decremented as well as how much demand those loads are expected to draw (based, for example, on a last known demand prior to shedding). If feeder module 708 determines that the current total load seen by virtual energy bus 706 plus the estimated load that will be added by decrementing the priority threshold does not exceed a desired maximum peak demand, the priority threshold will be decremented and the appropriate loads reset by the load modules. If feeder module 708 is configured such that load resetting is disabled, feeder module 708 will not reset the loads after load shedding is complete, but instead will allow loads that had been shed to be reset with custom control programming or via manual reset.

Figure 8:
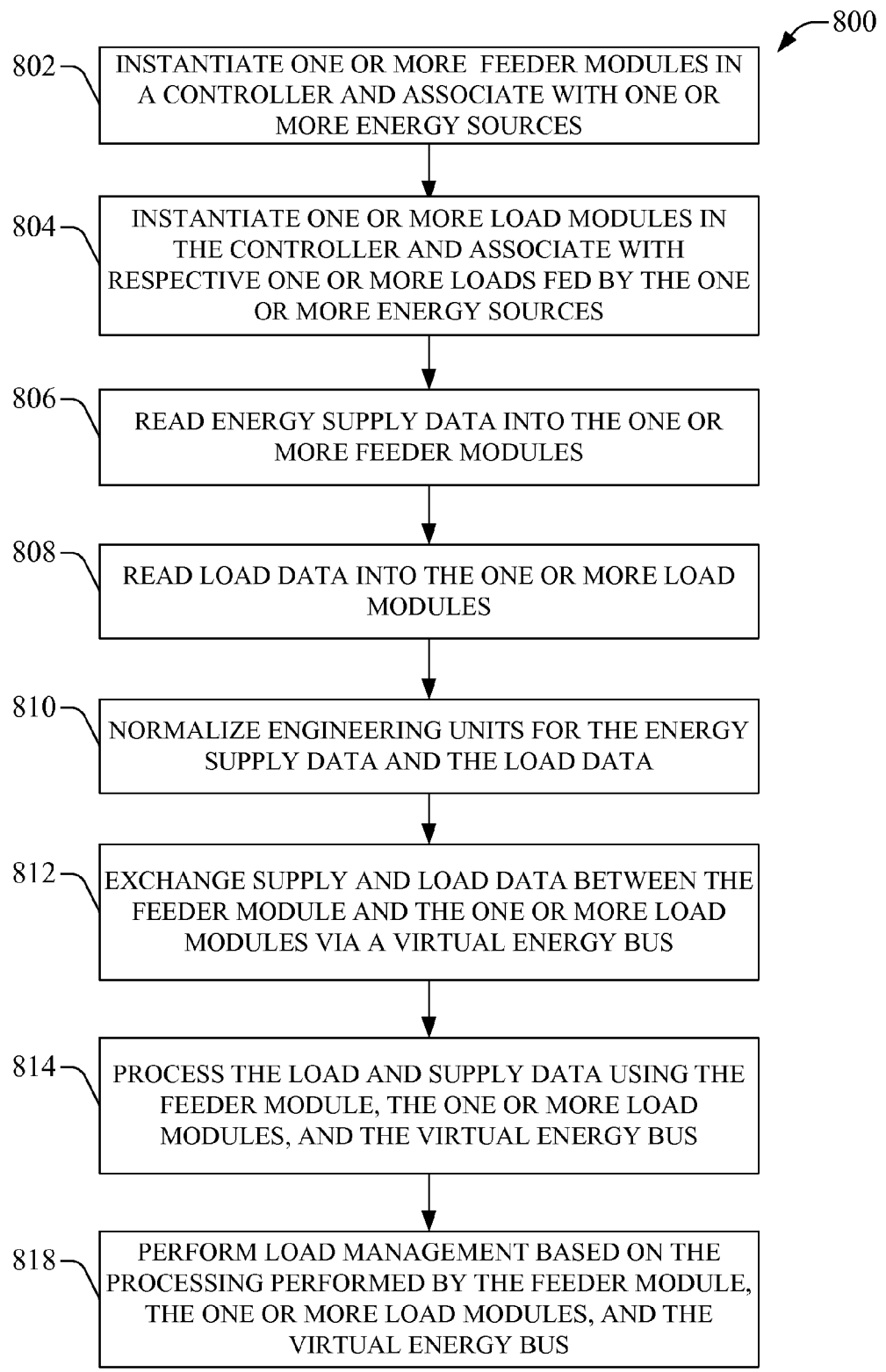
FIG. 8 is a flowchart of an example methodology for employing a modular load management architecture to manage energy loads in a facility.
Figure 9:
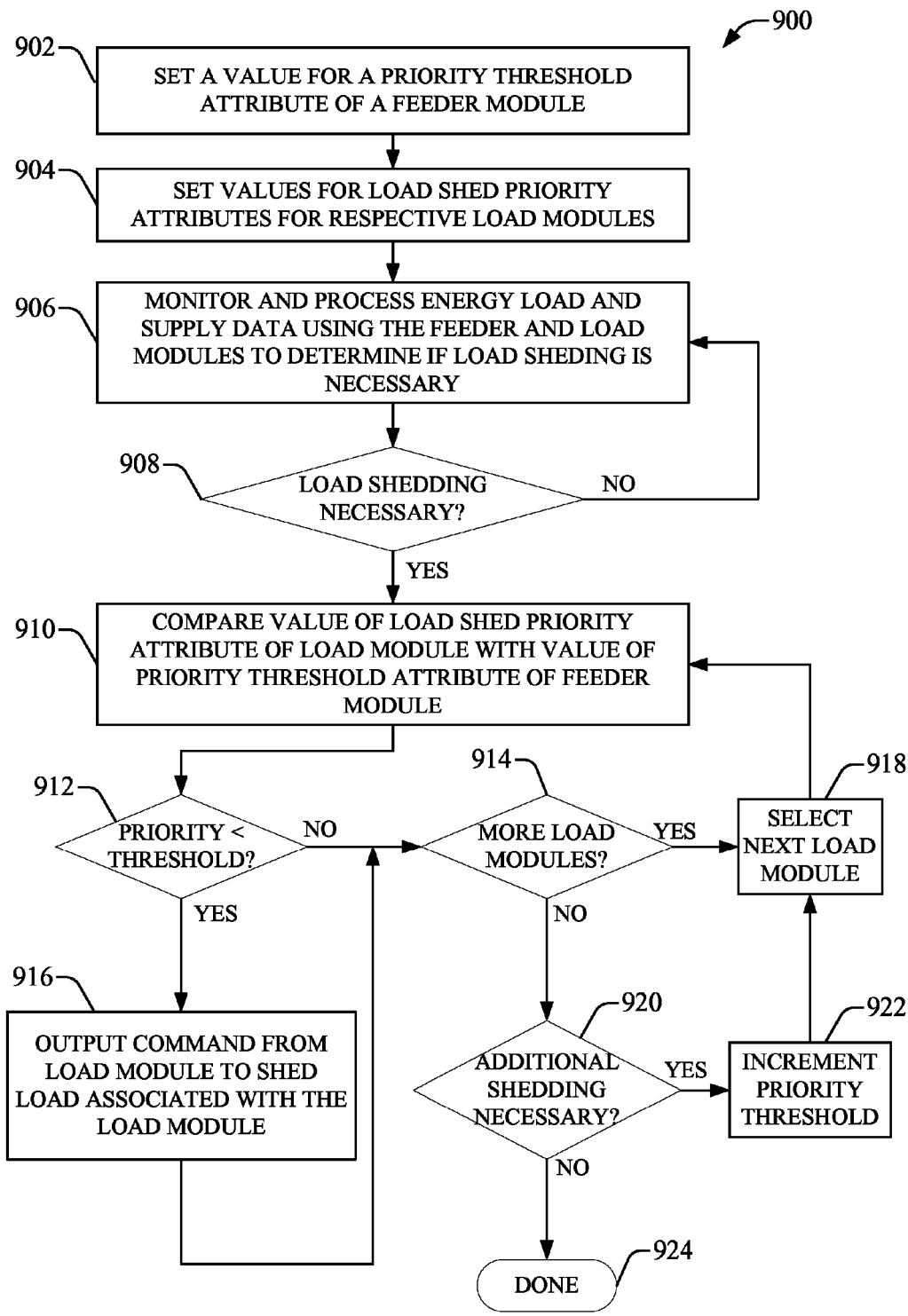
FIG. 9 is a flowchart of an example methodology for configuring and carrying out automated prioritized load shedding using configurable modules deployed in a controller.
Figure 10:
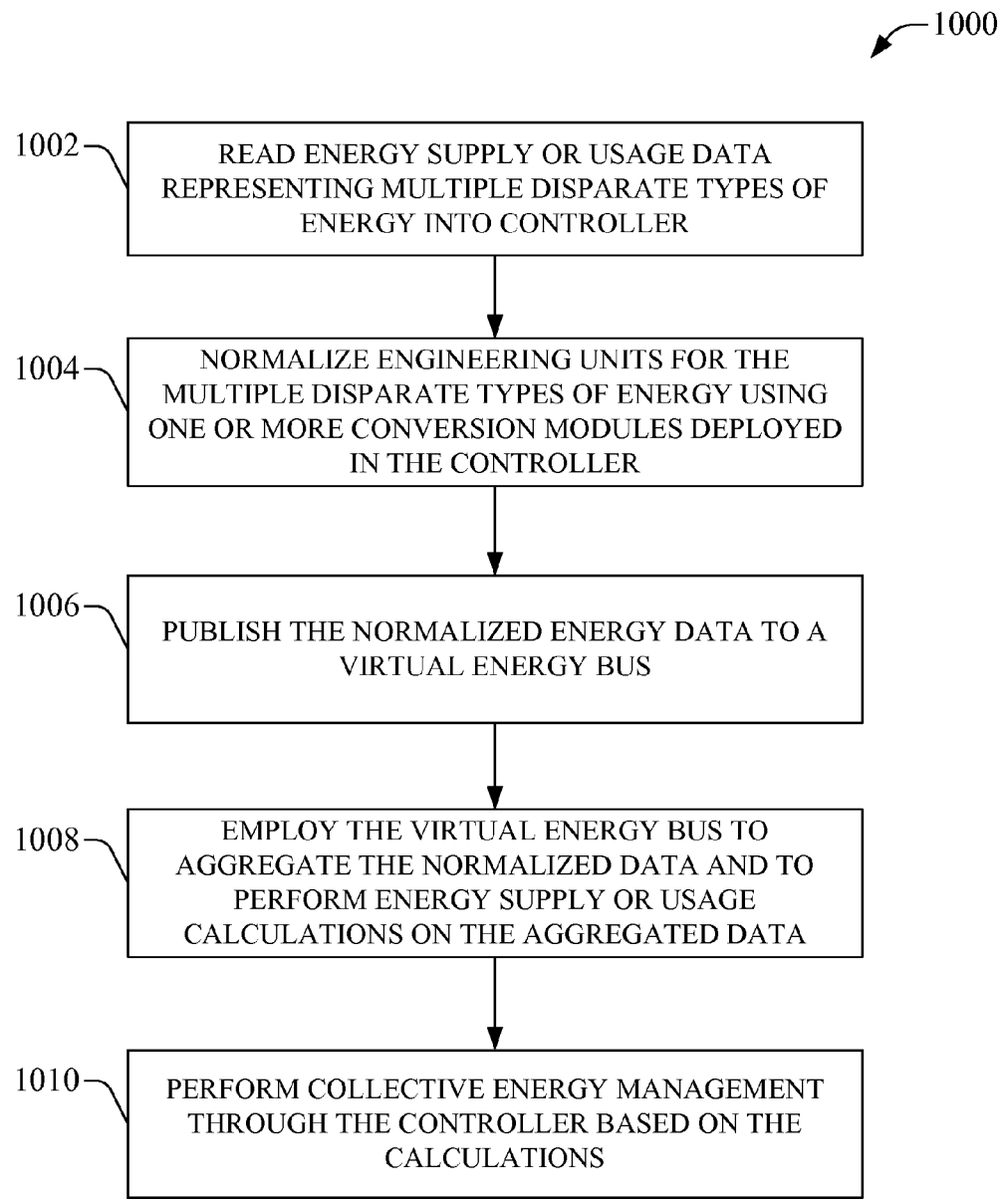
FIG. 10 is flowchart of an example methodology for normalizing disparate sets of energy data for collective load management.

FIGS. 8-10 illustrate various methodologies in accordance with the claimed subject matter. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 8 illustrates an example methodology 800 for employing a modular load management architecture integrated in an industrial controller to manage energy distribution in a facility. At 802, a feeder module is instantiated in a controller and associated with one or more energy sources that provide supply energy to drive one or more devices or machines within an industrial facility. The feeder module can comprise a deployable software module that can be integrated within a new or existing control program designed to control one or more operations in the industrial facility. The feeder module can interface with the control program through functional inputs and outputs associated with the module, and can be associated with energy sources of virtually any type, including electrical, gas, water, steam, air, or other such forms of energy. At 804, one or more load modules are instantiated in the controller and associated with respective one or more loads fed by the one or more energy sources. Like the feeder module, the load modules can be deployable software modules that integrate with the control program, as well as the feeder module, using associated predefined functional inputs and outputs. Each load associated with a load module can represent an individual device or machine, or a plurality of devices or machines that are collectively metered as a single load.

At 806, energy supply data is read into the feeder module. This can comprise, for example, receiving telemetry signals at the controller from one or more supply meters that measure available energy supply delivered to a feeder. The signals can comprise analog voltage or current signals generated by the meters and fed into an analog input associated with the controller, a data value generated by a smart meter and read into the controller over a network connection, or other such data transmission means. Since the energy sources can comprise multiple disparate energy types, the supply data can comprise data measured in multiple disparate engineering units. Likewise, at 808, load data from the one or more loads is read into the one or more load modules. As with the feeder data, the load data can be received at the controller in the form of telemetry signals from respective load meters that measure the energy draw for the loads. Since the loads can therefore comprise heterogeneous collection of devices fed by different types of energy (e.g., electrical, steam, gas, etc.), the load data can represent more than one type of energy, and can comprise data measured in multiple disparate engineering units (e.g., kW, joules, lbs, Btus, etc.). At 810, the energy supply data and the load data is normalized to a common engineering unit. Normalization of the data can be performed using one or more conversion modules deployed in the controller and configured to convert incoming energy data from a first engineering unit to a selected second engineering unit. In this way, supply and energy data representing disparate energy types can be standardized to a common unit for collective load analysis.

At 812, the normalized supply and load data is exchanged between the feeder modules and the load modules via a virtual energy bus deployed in the controller. That is, the load and feeder modules can publish their respective data to the virtual energy bus, and read data published to bus by other modules. The data exchanged between the feeder modules and load modules need not be limited to total available supply and energy draw. For example, load modules can publish shed or reset status information associated with their respective loads, availability information for the loads, or other such information. Likewise, in addition to available supply data, the feeder modules can publish, for example, a percentage of the total available supply being consumed by all loads associated with the virtual energy bus. By way of this data exchange, feeder modules can be provided with highly granular status data for their associated loads, while the load modules can be provided with information regarding the overall available supply.

At 814, the feeder modules, load modules, and virtual energy bus can process the normalized load and supply data. For example, the feeder modules can monitor the collective load data published to the virtual energy bus by the load modules and determine such statistics as the percentage of the total available supply that is being drawn by the loads, the shed or reset statuses of each load, an expected reduction of load that would result from shedding low priority loads, or other such information. At 818, load management for the system can be performed based on the processing performed at step 814. This can include, but is not limited to, initiating load shedding when the feeder module or virtual energy bus determines that demand (either raw demand or the demand-to-supply ratio) has exceeded a predetermined threshold, coordinating the load shedding so that low priority loads are shed before high priority loads, resetting loads in a prioritized order when load shedding is no longer necessary, or other load management functions. Since the load modules, feeder modules, and virtual energy bus are deployed within the controller and integrate with the control program executing therein, the modules and bus are able to leverage the controller's native I/O to effect managed control of the facility's load utilization.

FIG. 9 illustrates an example methodology 900 for configuring and carrying out automated prioritized load shedding using configurable modules deployed in a controller. At 902, a value is set for a priority threshold attribute of a feeder module. As described above, the feeder module can be a software module instantiated in the controller and having a number of predefined inputs, outputs, and configurable attributes. The feeder module is associated with an energy supply feeder that provides power to a number of load devices in an industrial facility and receives energy supply metering data for the feeder. At 904, values are set for respective load shed priority attributes for each of a plurality of load modules Like the feeder module, the load modules are configurable software modules having associated preconfigured inputs, outputs, and configurable parameters. Each load module acts as an interlock, via the native I/O of the controller, to a load device or a group of load devices fed by the supply feeder. Both the feeder module and the load modules can be integrated with and interact with a control program executing on the controller to effect control of one or more industrial processes.

At 906, energy load and supply data is monitored and processed by the load modules and the feeder module. To this end, the load data received by the load modules can be broadcast to the feeder module through a common reference to a virtual energy bus. The feeder module can then collectively monitor the loads in view of the available supply data to determine if load shedding is necessary at 908. If load shedding is not deemed necessary, flow returns to step 906, and the monitoring of load and supply data continues. Alternatively, if the feeder module determines that load shedding is necessary, the load shedding sequence can begin at 910, wherein the load shed priority attribute value for a load module is compared with the priority threshold value configured for the feeder module.

At 912, a determination is made regarding whether the load shed priority value for the load module is less than the priority threshold configured for the feeder module. If the load shed priority for the load module is not less than the threshold, flow moves to step 914, where it is determined whether there are additional load modules to be checked. Alternatively, if the load shed priority is less than the priority threshold configured for the feeder module, the load module generates an output command at 916 instructing the load or group of loads associated with the load module to enter a no-load or low-load state. This can comprise instructing the load(s) to switch to an off state or to low-power operation, or sending a control signal to open a breaker that disconnects the load from the feeder entirely. Flow then moves to 914, where it is determined whether there are additional load modules to be checked. If there are additional load modules, the process moves to the next load module at 918, then repeats the threshold comparison and load shedding sequence of steps 910-916 for the next module. Alternatively, if it is determined that all load modules have been compared with the priority threshold at 914, flow moves to 920, wherein it is determined whether additional load shedding is necessary. This determination can be made by the feeder module after all loads having configured load shed priorities less than the priority threshold have been shed. The feeder module can base the decision, for example, on whether the new total demand after load shedding (or the new load-to-supply ratio) still exceeds a desired threshold. If no additional shedding is necessary, the flow ends at 924. Alternatively, if the feeder module determines that additional shedding is required, the threshold priority is incremented at 922. The priority threshold can be incremented by the feeder module itself, or by the control program executing on the controller. The threshold comparison and load shedding sequence of steps 910-918 is then repeated using the new priority threshold.

FIG. 10 illustrates an example methodology 1000 for normalizing disparate sets of energy data for collective load management. At 1002, data relating to one or both of energy supply or energy usage within a facility are read into a controller. The energy data can be received at the controller from a plurality of disparate sources comprising two or more disparate energy types (e.g, electrical, steam, gas, water, air, etc.). As such, a first subset of the energy data accords to a first engineering unit (e.g., kW for electrical energy data), and a second subset of the energy data accords to a second engineering unit (e.g., joules for hydraulic or steam energy data). At 1004, one or more conversion modules deployed in the controller normalizes the data from the disparate energy sources. This can comprise converting all the energy data values from their original engineering units to a common engineering unit. Each conversion module can comprise an instantiated software module having predefined inputs, outputs, and configurable parameters. The parameters allow the user to easily configure the conversion module to associate a particular energy source or load therewith and to set input and output conversion factors and multipliers. Using these configured settings, each conversion module can receive the original energy supply or load data as an input, and generate a converted energy value as an output. In this way, energy data conversion can be achieved through simple module configuration, mitigating the need to write custom conversion code.

At 1006, the normalized energy date can be published to a virtual energy bus deployed within the controller. As described above, the virtual energy bus can receive data relating to both energy supplies and energy demands and generate highly granular views of the current energy supply and usage statuses for the facility. At 1008, the virtual energy bus can aggregate the normalized energy data and employ functions inherent in the bus to perform collective energy supply and usage calculations for the facility. This can involve calculating such values as the load-to-supply ratio, a number of loads referencing the virtual energy bus, expected change in total demand that would result from a load shedding or load resetting operation, shed or reset statuses, and other such data. These calculations can be employed internally by the controller, visualized on a display device, or provided to a data collection or reporting system. At 1010, the virtual energy bus or components associated therewith can perform collective energy management for the facility based on the calculations performed at 1008. For example, the virtual energy bus can determine that the current load-to-supply ratio necessitates shedding of load, and can trigger one or more controller outputs to disable specified machines accordingly.

Embodiments, systems and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet and ControlNet. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

Figure 11:
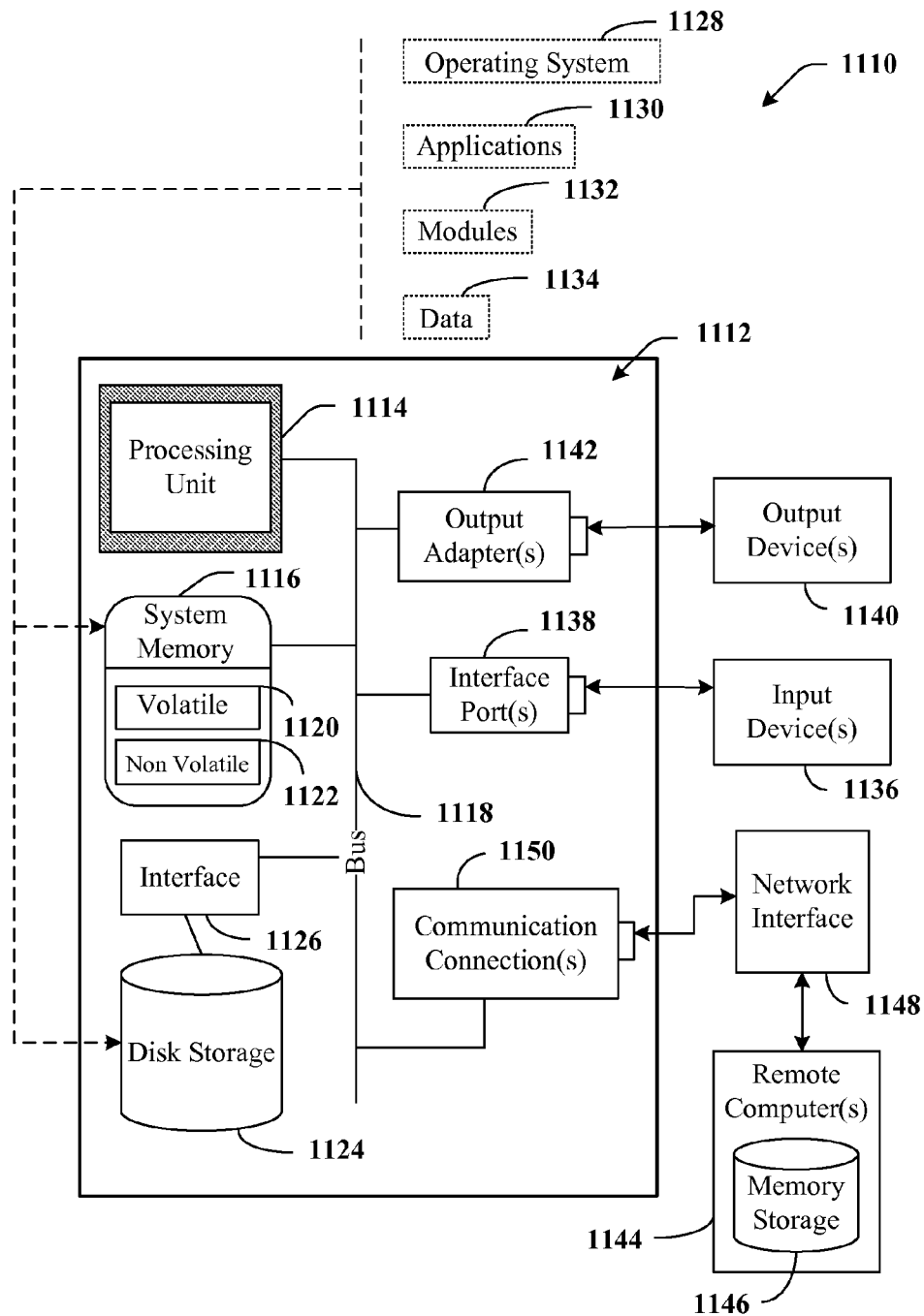
FIG. 11 is an example computing environment.

With reference to FIG. 11, an example environment 1110 for implementing various aspects of the aforementioned subject matter, including retaining documentation natively within memory of an industrial controller, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
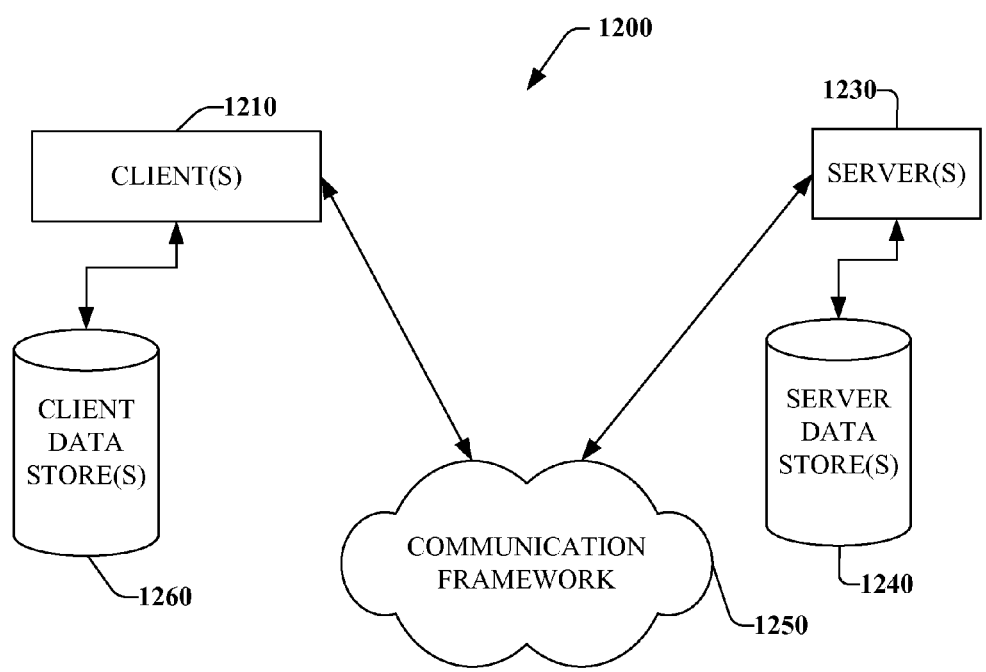
FIG. 12 is an example networking environment.

FIG. 12 is a schematic block diagram of a sample-computing environment 1200 with which the disclosed subject matter can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A system for managing delivery and consumption of energy, comprising:
   a memory; and
   a processor that facilitates execution of computer-executable components stored within the memory, the computer-executable components comprising:
      a feeder module deployed within an industrial controller; and
      one or more load modules deployed within the industrial controller and respectively corresponding to one or more energy consuming devices;
      wherein the feeder module is further configured to, in response to initiation of a load shedding mode, select a subset of the one or more load modules based on a comparison between a configurable priority threshold value associated with the feeder module and one or more configurable load priority values respectively associated with the one or more load modules, and to instruct the subset of the one or more load modules to switch a corresponding subset of the one or more energy consuming devices to a low-load state, and
      wherein the feeder module is further configured to increment the configurable priority threshold in response to a determination that a total demand satisfies a criterion after an elapse of a defined time period after initiation of the load shedding mode.

2. The system of claim 1, wherein the feeder module and the one or more load modules respectively comprise at least one input and at least one output, and wherein the at least one input and the at least one output are configured to interface with a program executing in the industrial controller.

3. The system of claim 1, wherein the feeder module is further configured to receive supply data representing a total supply energy measured from an energy supply feeder, and the one or more load modules are further configured to receive demand data measured for the one or more energy consuming devices.

4. The system of claim 3, wherein the demand data represents at least two different types of energy scaled in accordance with respective two different engineering units, and the computer-executable components further comprise at least one conversion module deployed within the industrial controller and configured to normalize the demand data to a common engineering unit in accordance with a configurable scaling parameter associated with the at least one conversion module.

5. The system of claim 3, wherein the one or more load modules are further configured to publish the demand data to a virtual energy bus deployed in the industrial controller, and the feeder module is further configured to determine the total demand based on the demand data published to the virtual energy bus.

6. The system of claim 5, wherein the feeder module is further configured to determine whether to initiate the load shedding mode based on an analysis of the demand data published to the virtual energy bus.

7. The system of claim 3, wherein the feeder module is further configured to initiate the load shedding mode in response to a determination that a ratio of the total demand to the total supply energy satisfies the criterion.

8. The system of claim 1, wherein the defined time period is a first defined time period, and a load module of the subset of the one or more load modules is configured to set a first bit in the industrial controller in response to a determination that an energy consuming device corresponding to the load module has not switched to a low-load state within a second defined time period after the initiation of the load shedding mode.

9. The system of claim 8, wherein the load module is further configured to set a second bit in response to a determination that the energy consuming device corresponding to the load module has switched to the low-load state within the second defined time period after the initiation of load shedding mode.

10. The system of claim 1, wherein the feeder module is further configured to estimate an amount of energy load that will be shed in response to the configurable threshold priority value being incremented.

11. A method for managing energy load, comprising:
   initiating, by a feeder module executing within an industrial controller comprising at least one processor, a load shedding mode;
   selecting, by the feeder module in response to the initiating, at least one load module executing within the industrial controller based on a comparison between a priority threshold value configured for the feeder module and at least one load priority value respectively associated with the at least one load module;
   instructing the at least one load module to transition a corresponding at least one energy load to a low-load state; and
   in response to determining that a total load of the at least one energy load satisfies a criterion after an elapse of a defined time period after the instructing, incrementing the priority threshold value.

12. The method of claim 11, further comprising:
   setting, by a load module of the at least one load module, a first bit in the industrial controller in response to a determination that an energy load corresponding to the load module has transitioned to a low-load state within another defined time period after the instructing; and
   setting, by the load module, a second bit in the industrial controller in response to a determination that the energy load corresponding to the load module has not transitioned to the low-load state within the other defined time period.

13. The method of claim 11, wherein the initiating comprises initiating the load shedding mode in response to determining that a ratio of the total load to a total available energy supply satisfies the criterion.

14. The method of claim 11, wherein the selecting comprises selecting, as the at least one load module, one or more load modules respectively comprising an associated load shed priority value that is less than the priority threshold value associated with the feeder module.

15. The method of claim 11, further comprising:
   receiving, by the feeder module, measured energy supply data from at least one energy source; and
   receiving, by the at least one load module, measured demand data from the at least one energy load powered by the at least one energy source.

16. The method of claim 15, wherein the receiving the measured demand data comprises:

receiving, by a first load module of the at least one load module, first demand data from a first energy load of a first energy type;

receiving, by a second load module of the at least one load module, second demand data from a second energy load of a second energy type; and normalizing, by at least one conversion module executing within the industrial controller, the first demand data and the second demand data to a common engineering unit.

17. The method of claim 15, further comprising initiating a rendering of one or more aggregated views of a current energy supply and an energy demand status on an interface using data generated by at least one of the feeder module or the at least one load module.

18. The method of claim 15, further comprising:

determining, by the feeder module, at least one of the total load or a percentage of a total available energy supply consumed by the at least one energy load based on the measured demand data received by the at least one load module.

19. A system for aggregated load monitoring and management of one or more energy distribution systems, comprising:

a controller comprising at least one processor and having deployed therein a feeder module and one or more load modules;

wherein the controller is configured to:

in response to an initiation of a load shedding mode by the feeder module, select a subset of the one or more load modules based on a comparison between a configurable threshold priority value associated with the feeder module and one or more configurable load priority values respectively associated with the one or more load modules, instruct the subset of the one or more load modules to switch a corresponding subset of one or more devices to a low-load state, and in response to a determination that a total energy demand of the one or more devices satisfies a criterion after a defined time period has elapsed subsequent to the initiation of the load shedding mode, increment the configurable threshold priority value.

20. The system of claim 19, wherein the defined duration is a first defined duration, and a load module of the one or more load modules is configured to set a bit in the controller in response to a determination that a device corresponding to the load module has not switched to a low-load state within a second defined duration after the initiation of the load shedding mode.

21. The system of claim 19, wherein the feeder module is configured to receive energy supply data from an energy feeder, and the one or more load modules are configured to receive demand data from respective one or more devices powered by the energy feeder.

22. The system of claim 21, wherein the controller further has deployed therein a virtual energy bus configured to generate, based on at least one of the energy supply data or the demand data, at least one of load data representing an energy load on the energy feeder, total load data representing the total energy demand reported by the one or more load modules as a percentage of a total energy supply, load shed status data representing a load shed status of the one or more devices, or load reset status data representing a load reset status of the one or more devices.

23. The system of claim 19, wherein the controller is further configured to send a signal that instructs the subset of one or more devices to switch to the low-load state.

24. The system of claim 23, wherein the defined time period is a first defined time period, and a load module, of the one or more load modules, is configured to generate a load shed status indication based on a determination of whether a device corresponding to the load module has switched to the low-load state within a second defined time period after sending the signal.

* * * * *